United States Patent
Rota

(10) Patent No.: US 9,943,799 B2
(45) Date of Patent: Apr. 17, 2018

(54) SEPARATION PROCESS OF GASEOUS COMPOUNDS FROM NATURAL GAS WITH LOW EXERGY LOSSES

(71) Applicant: ENI S.P.A, Rome (IT)

(72) Inventor: Renato Rota, Bergamo (IT)

(73) Assignee: Eni S.p.A., Rome (IT)

( * ) Notice: Subject to any disclaimer, the term of this patent is extended or adjusted under 35 U.S.C. 154(b) by 162 days.

(21) Appl. No.: 14/768,530

(22) PCT Filed: Feb. 13, 2014

(86) PCT No.: PCT/EP2014/052809
§ 371 (c)(1),
(2) Date: Aug. 18, 2015

(87) PCT Pub. No.: WO2014/128048
PCT Pub. Date: Aug. 28, 2014

(65) Prior Publication Data
US 2016/0001218 A1    Jan. 7, 2016

(30) Foreign Application Priority Data

Feb. 19, 2013 (IT) .............................. MI2013A0231

(51) Int. Cl.
*B01D 53/047* (2006.01)
*C10L 3/10* (2006.01)

(52) U.S. Cl.
CPC .............. *B01D 53/047* (2013.01); *C10L 3/10* (2013.01); *C10L 3/101* (2013.01); *C10L 3/103* (2013.01); *C10L 3/104* (2013.01); *C10L 3/105* (2013.01); *B01D 2253/102* (2013.01); *B01D 2253/104* (2013.01); *B01D 2253/106* (2013.01);
(Continued)

(58) Field of Classification Search
CPC ............ B01D 53/047; B01D 2253/102; B01D 2253/104; B01D 2253/106; B01D 2253/108; B01D 2253/204; B01D 2253/25; B01D 2256/245; B01D 2257/504; B01D 2259/402; Y02C 10/08; C10L 3/10;
(Continued)

(56) References Cited

U.S. PATENT DOCUMENTS 3,751,878 A     8/1973  Collins
4,521,221 A *   6/1985  Richter ................ B01D 53/047
                                                  166/267
(Continued)

OTHER PUBLICATIONS

Subramanian, et al. Equilibrium Theory for Solvent Vapour Recovery by Pressure Swing Adsorption: Analytical Solution for Process Performance, Chem. Eng. Sci., 52, 3147, 1997.
(Continued)

*Primary Examiner* — Frank Lawrence
(74) *Attorney, Agent, or Firm* — Abel Law Group, LLP

(57) ABSTRACT

The present invention relates to a separation process of natural gas from gaseous compounds present at the wellhead by means of at least two adsorption columns, each containing an adsorbing solid and one operating at a higher pressure than the other, said process being characterized in that:
•—the compression ratio is within the range of 1.1 to 10;
•—the ratio between the characteristic convective time through the column and the characteristic diffusive time in the adsorbing solid is higher than 1.

10 Claims, 3 Drawing Sheets

Figure 1:
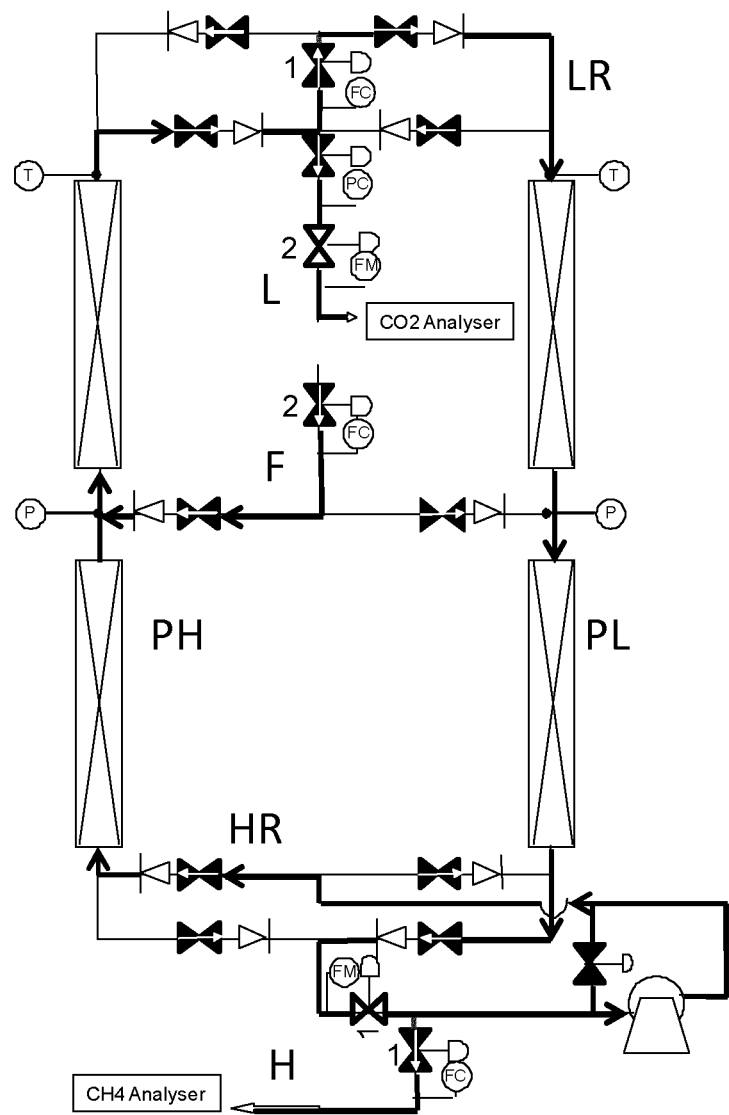

(52) U.S. Cl.
CPC .. *B01D 2253/108* (2013.01); *B01D 2253/204* (2013.01); *B01D 2253/25* (2013.01); *B01D 2256/245* (2013.01); *B01D 2257/504* (2013.01); *B01D 2259/402* (2013.01); *C10L 2290/542* (2013.01); *Y02C 10/08* (2013.01)

(58) Field of Classification Search
CPC .......... C10L 3/101; C10L 3/103; C10L 3/104; C10L 3/105
USPC ............. 95/96, 127, 130, 139, 136; 585/820
See application file for complete search history.

(56) References Cited

U.S. PATENT DOCUMENTS

| | | | |
|---|---|---|---|
| 4,857,083 A | | 5/1989 | DiMartino |
| 4,915,711 A | | 4/1990 | Kumar |
| 5,026,406 A | | 6/1991 | Kumar |
| 5,085,674 A | | 2/1992 | Leavitt |
| 5,174,796 A | * | 12/1992 | Davis ................... B01D 53/047 95/100 |
| 5,411,721 A | | 5/1995 | Doshi |
| 5,536,300 A | * | 7/1996 | Reinhold, III ....... B01D 53/047 95/101 |
| 5,938,819 A | | 8/1999 | Seery |
| 5,997,617 A | * | 12/1999 | Czabala ............. B01D 53/0446 96/130 |
| 7,763,099 B2 | | 7/2010 | Verma et al. |
| 2003/0047071 A1 | | 3/2003 | Dolan |
| 2013/0213229 A1 | * | 8/2013 | Shahin ................... B01J 20/267 95/96 |

OTHER PUBLICATIONS

Ebner, et al. "Equilibrium Theory Analysis of Rectifying PSA for Heavy Component Production," AIChE J., 48, 1679, 2002.
Sircar. "Separation of Methane and Carbon Dioxide Gas Mixtures by Pressure Swing Adsorption." Separation Science and Technology 23, 519-529, 1988.
Diagne, et al. "New PSA Process with Intermediate Feed Inlet Position and Operated with Dual Refluxes: Application to Carbon Dioxide Removal and Enrichment." J. Chem. Eng. Japan. 27, 85, 1994.
Diagne, et al. "Parametric Studies on CO2 Separation and Recovery by Dual Reflux PSA Process Consisting of Both Rectifying and Stripping Sections." Ind. Eng. Chem. Res., 34, 3083, 1995.
Yang. "Gas Separation by Adsorption Processes." Imperial College Press, Singapore, 1997.
Ruthven, et al. "Pressure Swing Adsorption." VCH, New York, 1994.
Mcintyre, et al. "High Enrichment and Recovery of Dilute Hydrocarbons by Dual-Reflux Pressure-Swing Adsorption." Ind. Eng. Chem. Res., 41 3499, 2002.
Diagne, et al. "Experimental Study of Simultaneous Removal and Concentration of CO2 by an Improved Pressure Swing Adsorption Process." Energy Convers. Mgmt. 36, 431-434, 1995.
Mcintyre, et al. "Experimental Study of a Dual Reflux Enriching Pressure Swing Adsorption Process for Concentrating Dilute Feed Streams." Ind. Eng. Chem. Res. 49, 1848-1858, 2010.
Grande, et al. "Dual Pressure Swing Adsorption Units for Gas Separation and Purification." Ind. Eng. Chem. Res. 51, 8695-8699, 2012.
Spoorthi, et al. "Process intensification in PSA processes for upgrading synthetic landfill and lean natural gases." Adsorption 17, 121-133, 2011.
Thakura, et al. "Process intensification in duplex pressure swing adsorption." Computers and Chemical Engineering 35, 973-983, 2011.
Sivakumar, et al. "Modified Duplex PSA. 2. Sharp Separation and Process Intensification for N2-02-5A Zeolite System." Ind. Eng. Chem. Res. 50, 3437-3445, 2011.
Sivakumar, et al. "Modified Duplex PSA.1. Sharp Separation and Process Intensification for C02-N2-13X Zeolite System." Ind. Eng. Chem. Res. 50, 3426-3436, 2011.
Kearns, et al. "Modelling and evaluation of dual-reflux pressure swing adsorption cycles: Part I. Mathematical models." Chemical Engineering Science 2006, 61, 7223-7233.
International Search Report and Written Opinion dated May 8, 2014 for PCT/EP2014/052809.
International Preliminary Report on Patentability dated May 28, 2015 for PCT/EP2014/052809.
Diagne, et al. "Numerical Analysis of a Dual Refluxed PSA Process during Simultaneous Removal and Concentration of Carbon Dioxide Dilute Gas from Air." J. Chem. Tech. Biotechnol., 65, 29, 1996.
Yang. "Adsorbents: Fundamentals and Applications." Wiley-Interscience, 2003.

* cited by examiner

SEPARATION PROCESS OF GASEOUS COMPOUNDS FROM NATURAL GAS WITH LOW EXERGY LOSSES

The present invention relates to a separation process, with low exergy losses, of natural gas from gaseous compounds such as helium, nitrogen, carbon dioxide, hydrogen sulfide, present at the wellhead.

In particular, the present invention relates to the separation of natural gas from acid gases which are present in large quantities within the range of 5% to 95% by volume.

More specifically, the present invention relates to an improved process of the "Dual Reflux Pressure Swing Adsorption" (DR-PSA) type for the separation of acid gases present in large quantities within the range of 5% to 95% by volume in natural gas at the wellhead (generally known as bulk separation processes).

The exploitation of natural gas reservoirs with high contaminations, known as "low-Btu gas", is not often considered as being economically interesting, due to the high energy costs associated with traditional "bulk" separation technologies.

The two main technologies available for the separation of acid gases from natural gas are based on chemical absorption processes (essentially based on amines) or physical absorption (based on solvents) and on membrane processes.

Processes with amines and solvents are based on the reversible absorption of acid gases in an aqueous solution of amines or a suitable solvent. The process is normally carried out in a packed column or plate column, operating at a low temperature and high pressure during the acid gas removal phase, and at a high temperature and low pressure in the solvent regeneration phase and consequent production of the stream of acid gases. Membrane processes, on the contrary, are based on the absorption of acid gases on a polymeric membrane which allows their selective passage, thus creating a low-pressure stream enriched in the acid gas, and a high-pressure stream enriched in natural gas. Separation processes based on the selective adsorption of acid gases on a solid are mainly used within technologies called Pressure Swing Adsorption (PSA). The PSA technology (which is called Vacuum Swing Adsorption or VSA when the lower pressure limit of the cycle is below the atmospheric value) has been known since the sixties' and essentially consists in passing a mixture of gases over an adsorbing solid bed, considered, for the sake of simplicity, as being composed of two chemical species, of which a "heavy" species is adsorbed more strongly, whereas the other "light" species is adsorbed less strongly. These are therefore cyclic, non-stationary processes which comprise a phase, operating at high pressure, for the accumulation of acid gases on the adsorbing solid, and a phase, operating at low pressure, for releasing the acid gas from the adsorbing solid. In this respect, reference should be made, for example, to Yang, R. T., Gas Separation by Adsorption Processes, Imperial College Press, Singapore, 1997; Ruthven, D. M., S. Farooq, and K. S. Knaebel, Pressure Swing Adsorption, VCH, New York, 1994. In this way it is possible to obtain a stream enriched in acid gases and a stream enriched in natural gas. A limit of the PSA technology is that only one of the two streams can be obtained with the desired purity. The process which allows the light compound to be obtained with the desired purity is called "Stripping-type Pressure Swing Adsorption" (S-PSA), whereas the process which allows the heavy compound to be produced with high purity, is called "Rectifying-type Pressure Swing Adsorption" (R-PSA). Reference can be made, in this respect, for example, to D. Subramanian, J. A. Ritter, Equilibrium Theory for Solvent Vapour Recovery by Pressure Swing Adsorption: Analytical Solution for Process Performance, Chem. Eng. Sci., 52, 3147, 1997; A. D. Ebner, J. A. Ritter, Equilibrium Theory Analysis of Rectifying PSA for Heavy Component Production, AIChE J., 48, 1679, 2002. With this limit of the PSA technology, low values either of the recovery or purity of the natural gas produced, are obtained. Numerous other processes can derive from these two basic processes (S-PSA and R-PSA), having a higher complexity which essentially try to overcome the problem of the limited purity of one of the two streams, some of which have been proposed for the separation of acid gases from natural gas. Reference can be made, for example, to the following publications:

J. J. Collins, Bulk separation of carbon dioxide from natural gas, U.S. Pat. No. 3,751,878 1973;

S. P. Di Martino, Vacuum swing adsorption process with vacuum aided internal rinse, U.S. Pat. No. 4,857,083 1989;

R. Kumar, Adsorptive process for producing two gas streams from a gas mixture, U.S. Pat. No. 4,915,711 1990;

R. Kumar, Adsorptive process for producing two gas streams from a gas mixture, U.S. Pat. No. 5,026,406 1990;

M. W. Seery, Bulk separation of carbon dioxide from methane using natural clinoptilolite U.S. Pat. No. 5,938,819 1999;

S. Sircar, Separation of methane and carbon dioxide gas mixtures by pressure swing adsorption, Separation Science and Technology 23, 519-529, 1988;

M. M Davis, R. L. Gray, K. Patel, Process for the purification of natural gas, U.S. Pat. No. 5,174,796 1992;

K. J. Doshi, W. B. Dolan, Process for the rejection of $CO_2$ from natural gas, U.S. Pat. No. 5,411,721, 1995;

W. B. Dolan, M. J. Mitariten, $CO_2$ rejection from natural gas, US Patent US 2003/0047071 A1, 2001.

These processes, however, require high compression ratio values, complex cycle sequences and/or trains of multiple columns for producing the two relatively pure components, thus contemporaneously obtaining a high purity and a high recovery of natural gas. The compression ratio is defined as the ratio between the maximum and minimum operating pressure value of the process.

The S-PSA and R-PSA processes can be combined in a dual reflux to obtain the process known as the "Dual Reflux Pressure Swing Adsorption (DR-PSA) as illustrated in the following publications:

D. Diagne, M. Goto, T. Hirose, New PSA Process with Intermediate Feed Inlet Position and Operated with Dual Refluxes: Application to Carbon Dioxide Removal and Enrichment, J. Chem. Eng. Japan. 27, 85, 1994;

D. Diagne, M. Goto, T. Hirose, Parametric Studies on CO2 Separation and Recovery by Dual Reflux PSA Process Consisting of Both Rectifying and Stripping Sections, Ind. Eng. Chem. Res., 34, 3083, 1995;

D. Diagne, M. Goto, T. Hirose, Numerical Analysis of a Dual Refluxed PSA Process during Simultaneous Removal and Concentration of Carbon Dioxide Dilute Gas from Air, J. Chem. Tech. Biotechnol., 65, 29, 1996;

J. A. McIntyre, C. E. Holland, J. A. Ritter, High Enrichment and Recovery of Dilute Hydrocarbons by Dual-Reflux Pressure-Swing Adsorption, Ind. Eng. Chem. Res., 41 3499, 2002;

D. Diagne, M. Goto, T. Hirose, Experimental Study of Simultaneous Removal and Concentration of $CO_2$ by an Improved Pressure Swing Adsorption Process, Energy Conyers. Mgmt. 36, 431-434, 1995;

J. A. McIntyre, A. D. Ebner, J. A. Ritter, Experimental Study of a Dual Reflux Enriching Pressure Swing Adsorption Process for Concentrating Dilute Feed Streams, Ind. Eng. Chem. Res. 49, 1848-1858, 2010;

C. A. Grande, R. Blom, Dual Pressure Swing Adsorption Units for Gas Separation and Purification, Ind. Eng. Chem. Res. 51, 8695-8699, 2012;

G. Spoorthi, R. S. Thakur, N. Kaistha, D. P. Rao, Process intensification in PSA processes for upgrading synthetic landfill and lean natural gases, Adsorption 17, 121-133, 2011;

R. S. Thakura, N. Kaisthaa, D. P. Rao, Process intensification in duplex pressure swing adsorption, Computers and Chemical Engineering 35, 973-983, 2011;

S. V. Sivakumar, D. P. Rao, Modified Duplex PSA. 2. Sharp Separation and Process Intensification for $N_2$—$O_2$-5A Zeolite System, Ind. Eng. Chem. Res. 50, 3437-3445, 2011;

S. V. Sivakumar, D. P. Rao, Modified Duplex PSA. 1. Sharp Separation and Process Intensification for $CO_2$—$N_2$-13X Zeolite System, Ind. Eng. Chem. Res. 50, 3426-3436, 2011;

S. Verma, T. S. Ramakrishnan, Downhole separation of carbon dioxide from natural gas produced from natural gas reservoir, U.S. Pat. No. 7,763,099, 2010;

F. W. Leavitt, Duplex adsorption process, U.S. Pat. No. 5,085,674.

The DR-PSA process allows enrichments in the light and heavy components with the only limit of the material balance. The extreme limit of a DR-PSA system is therefore the complete separation of a binary feeding into two pure components (A. D. Ebner, J. A. Ritter, Equilibrium Theory Analysis of Rectifying PSA for Heavy Component Production, AIChE J., 48, 1679, 2002).

The main critical aspect of absorption processes is the high energy consumption due to the regeneration of the solvent, which can be estimated as being in the order of 4 GJ/ton $CO_2$ in amine processes. Furthermore, if the separated acid gases must be re-injected into the subsoil, the energy costs are increased due to the necessity of re-compressing the stream of acid gas which is produced at low pressure. If aqueous solutions of amines are used, there is a further energy cost due to the dehydration of the stream of natural gas produced.

Typically, the membranes cannot reach high separation degrees and consequently multiple steps are necessary, or one of the streams produced must be recycled to obtain acceptable recoveries of natural gas. This leads to an increase in the complexity of the process, a higher energy consumption which can be estimated as being in the order of 0.7 GJ/ton $CO_2$ for a two-step process and consequently an increase in costs. In addition, as in the case of absorption processes, when the acid gases separated must be injected into the subsoil, the energy costs are increased due to the necessity of recompressing the stream of acid gas which is produced at low pressure. Processes of the PSA type normally operate with high compression ratios in order to reach high purity and recovery values. As the gas stream at the wellhead is already under pressure, this leads to a high exergy loss, i.e. useful work, of said stream, due to the fact that the adsorption column is operating at low pressure values during the production phase of the stream enriched in acid gases. This stream of acid gases produced at low pressure must then be recompressed in order to be re-injected into the subsoil, with a further energy cost.

An objective of the present invention is therefore to provide a separation process of natural gas from gaseous compounds present at the wellhead, with low exergy losses.

Said process must be carried out under particular operating conditions which allow a high recovery and high purity of the stream of natural gas produced, to be obtained, at the same time minimizing the loss of exergy of the stream of natural gas present at the wellhead, thus exploiting part of the pressure of said stream for the re-injection of the stream of acid gases into the reservoir.

Further objectives and advantages of the present invention will appear evident from the following description and enclosed drawings provided for purely illustrative and non-limiting purposes.

FIG. 1 illustrates a scheme of the experimental equipment on a laboratory scale, used for validating the mathematical simulation model. The arrows indicate the routes of the different streams in the phase in which one column receives the feed and the other is purged, in this text indicated as "feed/purge" phase. In FIG. 1, PH indicates high pressure; PL low pressure; F is the feeding stream; H the "heavy" stream, i.e. of acid gases; L the "light" stream, i.e. of natural gas; LR the recycled "light" stream; HR the recycled "heavy" stream.

Figure 2:
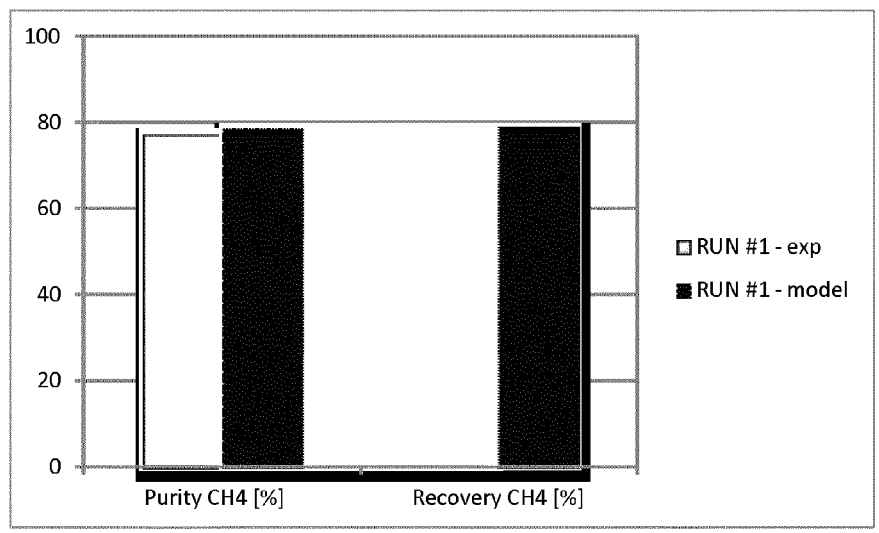

FIG. 2 illustrates a comparison between the experimental results and predictions of the mathematical model in terms of recovery and purity of methane.

Figure 3:
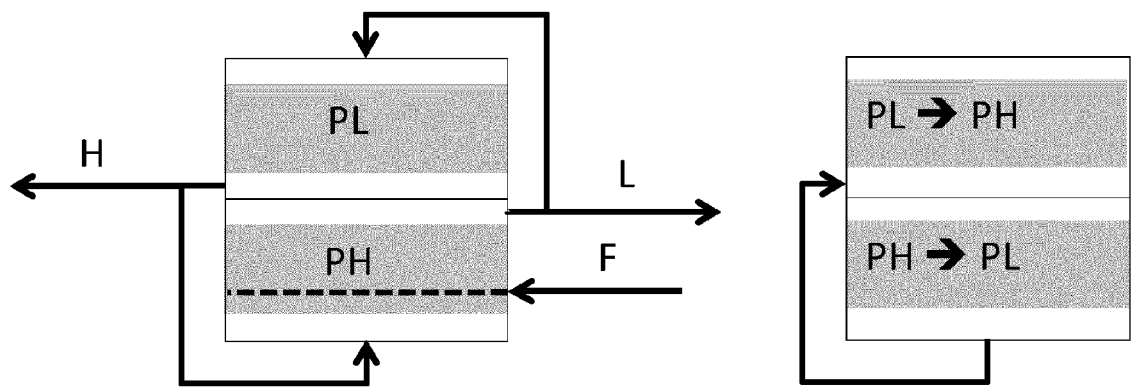

FIG. 3 illustrates the functioning scheme of the single module, consisting of two columns in the "feed/purge" phase, on the left, and depressurization/pressurization phase on the right, in the present text indicated as "blowdown/pressurization" wherein the high-pressure column is depressurized whereas the low-pressure column is pressurized. In FIG. 3, PH indicates high pressure; PL low pressure; F is the feeding stream; H the "heavy" stream, i.e. acid gases; L the "light" stream, i.e. natural gas.

Figure 4:
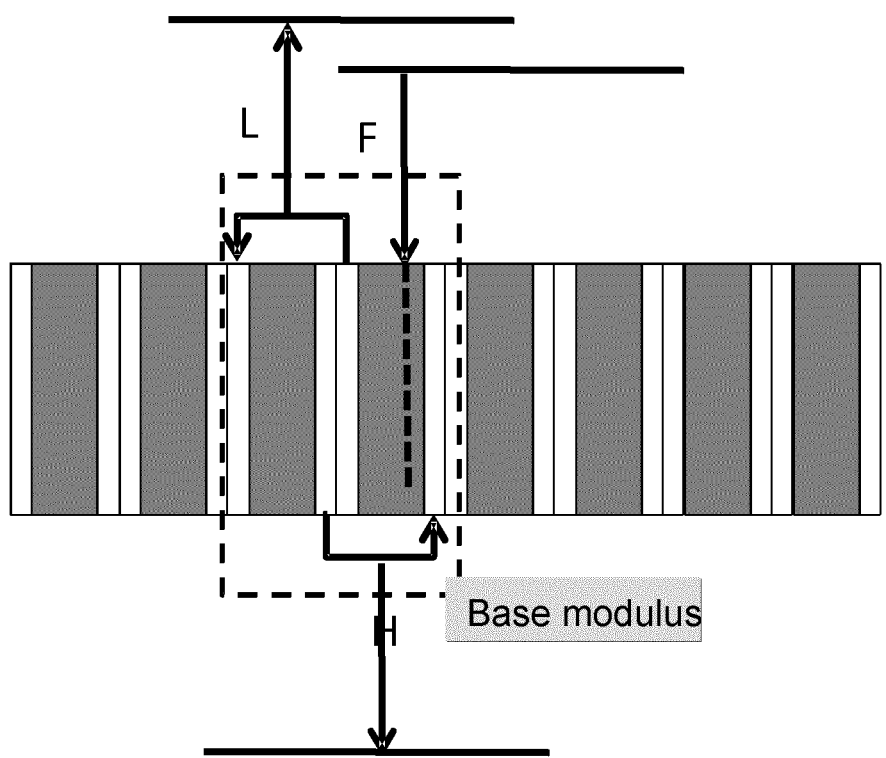

FIG. 4 illustrates a possible assembly scheme of the various modules necessary for treating a fixed flow rate of natural gas, exemplified for the "feed/purge" phase. F is the feeding stream; H the "heavy" stream, i.e. acid gases; L the "light" stream, i.e. natural gas.

DETAILED DESCRIPTION

For the purposes of the present description, the term "comprising" or "including" also comprises the term "essentially consisting of" or "only consisting of".

Furthermore, for the purposes of the present description, the definition of the numerical ranges always include the extremes, unless otherwise specified.

The object of the present patent application relates to a process for the separation of natural gas from gaseous products, preferably acid gases, present at the wellhead, with low exergy losses.

Said gaseous compounds are preferably helium, nitrogen, carbon dioxide and hydrogen sulfide, the latter two compounds, in particular, fall within the definition of acid gases. Also other gaseous products can be present in non-significant quantities.

The gaseous compounds can be present in high quantities, within the range of 5% to 95% by volume, preferably within the range of 30%-80% by volume. The separation process is preferably of the Dual Reflux Pressure Swing Adsorption (DR-PSA) type.

The separation of the gaseous compounds from the natural gas must take place with the use of at least two adsorbing columns, each containing an adsorbing solid. One of these columns operates at a higher pressure with respect to the other; the column operating at a higher pressure has an operating pressure close to that of the wellhead. The pressure at the wellhead has variable values in relation to the type and life of the well itself.

The separation process object of the present invention is characterized by the fact that the compression ratio must be within the range of 1.1 to 10, preferably ranging from 1.3 to 3.0.

Furthermore, in the separation process described and claimed in the present text, the ratio between the characteristic convective time through the column and the characteristic diffusive time in the adsorbing solid must be higher than 1, preferably within the range of $10^2$ to $10^4$.

In the present text, the compression ratio is defined as the ratio between the maximum and minimum pressure value at which the process operates.

In the present text, the characteristic convective time through a column is defined as the ratio between the empty volume of the column and the volumetric flow-rate; whereas the characteristic diffusive time in the adsorbing solid is defined as the ratio between the square of the equivalent radius of the particles of the adsorbing solid and the effective diffusivity of the gas.

Said separation process operates at temperatures ranging from $-10°$ C. to $100°$ C., preferably from $15°$ C. to $55°$ C. Advantageously, after separation, the gaseous compounds separated, among which the acid gases, can be re-injected into the reservoir. This step is possible as the process described and claimed allows the exergy losses of the stream of natural gas present at the wellhead, to be minimized.

The use of low compression ratio values allows exergy losses to be limited. Furthermore, in order to obtain high recovery and purity values, it is fundamental for the ratio between the characteristic diffusive time in the adsorbing solid to be much lower than the characteristic convective time of the flow through the column.

A combination of these two operative conditions, when a significant flow-rate of natural gas must be processed, implies that the adsorption columns used have a high diameter/length ratio. The section of the columns, therefore the diameter, is defined on the basis of economic evaluations.

When the diameter/length ratio is high, the adsorption columns can be assembled in a basic module so as to form an extremely compact volume. In the basic module, the two adsorption columns are assembled so that one of the two base surfaces of a column is adjacent to and in contact with one of the two base surfaces of the other column. These basic modules can be assembled sequentially, either vertically or horizontally, thus reducing the overall encumbrance and problems of mechanical resistance of the single modules. Each basic module, in fact, except for the two positioned at the extreme ends of the separation device, must support, on the head and on the bottom, maximum pressure ratios equal to the compression ratio instead of the order of the ratio between the wellhead pressure and atmospheric pressure.

In the dimensioning of the modules, the operative conditions for the basic module must first be defined, which must be capable of processing a certain specific flow-rate of natural gas, in terms of $Nm^3$ of natural gas per day and per $m^2$ of section of the column. Once the overall flow-rate of natural gas to be treated in the basic module has been defined, number of modules necessary can be easily calculated.

The adsorbing solid of the columns must have suitable selectivity characteristics among the components of the natural gas and acid gases, and must be capable of varying the specific quantity of natural gas and acid gases adsorbed within the pressure range at which the process is operating. The adsorbing solid must therefore effect the separation of methane from the other gases thanks to the difference between the adsorption isotherms of the gases to be separated.

The adsorbing solid must also preferably allow a rapid diffusion of the gases. The adsorbing solid can belong to any group (for example, those described in R. T. Yang, Adsorbents: Fundamentals and Applications, Wiley-Interscience, 2003) provided the same has the above-mentioned properties. Said materials can be selected from zeolites, activated carbons (also chemically modified), alumina, silica gel and other mesoporous materials (also with chemical compounds, including ionic liquids, immobilized) Metal-Organic Framework (MOF). It preferably belongs to the group of activated carbons with a selectivity within the range of 1.5-2.5 and a surface area of over 3,000 $m^2/g$.

The columns of a single basic module can treat a flow-rate of natural gas which satisfies the requirements defined in the present text, in terms of characteristic times, but preferably about 3,000 $Nm^3$ of natural gas per day and per $m^2$ of column section, and they have a high diameter/height ratio, so as to allow a high ratio between the convective characteristic time and the diffusive characteristic time.

FIG. 3 represents a preferred embodiment of the present invention. According to FIG. 3, the feeding (F) is effected in an intermediate position of the column operating at a higher pressure (PH) defined on the basis of the model at equilibrium of the DR-PSA process (D. T. Kearns, P. A. Webley, Modelling and evaluation of dual-reflux pressure swing adsorption cycles: Part I. Mathematical models, Chemical Engineering Science 2006, 61, 7223-7233).

During the "feed/purge" phase, during which one column receives the feed and the other is purged of the acid gases, one column operates at a higher pressure (PH) with respect to the other (PL). The ratio between these two pressures ranges from 1.1 to 10 and preferably from 1.3 to 3.0.

During the "feed/purge" phase, a stream leaves the head of the column at a higher pressure (PH), which is operating in "feed" phase, said stream being rich in natural gas (L) which partially forms one of the process products and is partially recycled to the head of the column at a lower pressure (PL), which is operating in "purge" phase. A stream rich in acid gases (H), which partially forms the second process product and is partially recompressed and recycled to the tail of the column at a higher pressure (PH), leaves the tail of the column operating at a lower pressure.

The stream of natural gas (L) is then produced at a pressure very close to that of the wellhead (compatibly with the mechanical characteristics of the columns), whereas the stream of acid gases is produced at a pressure defined by the compression ratio used: if this value is close to 1, the pressure of the stream of acid gases is close to the pressure at the wellhead.

The feeding is interrupted after a certain period of time, and the "blowdown/pressurization" phase is started, wherein the higher-pressure column is depressurized by discharging the gases from the tail until the pressure value at which the column in "purge" phase operates, whereas the column at a lower pressure is pressurized by feeding the same gases to the tail of the column itself, until reaching the value of the pressure at which the column in "feed" phase is operating. The stream of acid gases, produced at a much higher pressure with respect to atmospheric pressure and therefore with a limited exergy loss with respect to the stream of the wellhead, is then re-pressurized and re-injected into the reservoir.

Alternatively, the same phases can be effected by feeding the stream to be separated to the low-pressure column in the "feed-purge" phase and/or by discharging the gases from the head of the column which has operated at high pressure and/or by feeding the same gases to the head of the column which has operated at low pressure.

The process can also be effected using intermediate storage tanks of gas between the two columns, instead of sending the discharged gases directly from one column to the other.

The dimensioning of the system for treating a certain flow-rate of natural gas simply consists in assembling in parallel, a number of modules operating in the "feed-purge" phase, in a single vertical or horizontal column. The process is then made continuous by adding a number of modules which simultaneously operate in the "blowdown/pressurization" phase.

The ratio between the number of modules operating in the two phases is simply equal to the ratio between the times of the two phases.

The division of the overall flow-rate over a certain number of equal modules allows any ratio between the times of the two phases to be easily managed. The distribution of the gas streams in feeding, produced and to be recycled, is managed by a suitable system of valves and distributors.

Example 1

In order to verify the reliability of the mathematical model, experimental tests were carried out on a laboratory scale using an apparatus whose scheme is shown in FIG. 1. The experimental tests were carried out under conditions far from the complete separation of the stream fed in order to verify the capacity of the mathematical model in correctly reproducing non-asymptotic behaviours. As an example, the main operating conditions of a typical experimental test are indicated in Table 1.

TABLE 1

| Run | Compression ratio | Feeding flow-rate [NL/h] | Recirculation flow-rate of light product [NL/h] | "Feed/purge" time [s] |
|---|---|---|---|---|
| 1 | 2.2 | 5.1 | 15.7 | 490 |

Two columns were used for the experimental tests, one with an overall volume of about 1 [L] fed to the centre with a mixture of methane/carbon dioxide with concentrations of 70/30 by volume. The comparison between the experimental results and predictions obtained with the mathematical model are indicated in FIG. 2, from which a good agreement can be observed between the experimental results and the predictions of the mathematical model, which can therefore be considered as being a reliable project instrument.

Example 2

A well capable of producing 800,000 $Nm^3$ of natural gas per day with a high percentage of carbon dioxide (equal to about 57.5%) and a pressure at the wellhead of about 50 [bar], was considered as study case. The high-pressure column was therefore operated at 50 [bar], whereas commercial Activated Carbon Maxsorb III was selected as adsorbing solid.

The main characteristics of the study case considered are indicated in Table 2.

TABLE 2

| | |
|---|---|
| Specific feeding flow-rate [$Nm^3$/(day $m^2$ of column section)] | 3400 |
| Specific recirculation flow-rate of light product [$Nm^3$/(day $m^2$ of column section)] | 16000 |
| Compression ratio | 1.4 |
| Height of column [m] | 0.7 |
| Feed/purge time [s] | 120 |
| Blowdown/pressurization time [s] | 24 |
| Position of the feeding [m] | 0.17 |

The single module operates in "feed/purge" and "blowdown/pressurization" phases as schematized in FIG. 3. Under the conditions defined above, the process is capable of reaching stationary cyclic conditions with a purity of the natural gas of about 99% and a recovery of about 98%.

The single modules can then be assembled as indicated in FIG. 4, so as to reduce the mechanical stress on the head and tail of the single modules which, except for the two ends, must support a ratio between internal and external pressure equal to 1.4 instead of 50. The number of modules necessary depends on the section of the column, which, in turn, must be defined on the basis of an economic evaluation. Assuming, by way of example, a diameter equal to 6 [m], each module is capable of treating a flow-rate equal to about 96,000 [$Nm^3$/day] of natural gas; 9 modules will therefore be necessary in the "feed/purge" phase for treating a flow-rate of 800,000 [$Nm^3$/day] of natural gas. In order to make the process continuous, 2 modules operating in "blowdown/pressurization" phase must then be added, for a total of 11 modules. Reducing the diameter of the single module simply leads to an increase in the number of modules, just as varying the flow-rate of natural gas to be treated simply leads to varying the number of modules. The energy cost associated with the compression of the different streams during the two phases of the process and recompression of the stream of acid gases up to the pressure at the wellhead to allow it to be re-injected into the reservoir, is equal to about 10 [MJ/kmol $CO_2$] and is even lower than the energy cost of the recompression alone, necessary for re-injecting the stream of acid gases into the reservoir at atmospheric pressure leaving an amine or membrane process, which can be estimated as being equal to about 15 [MJ/kmol $CO_2$]. For both processes, the cost of the process itself must be added to this energy cost, which, for the amine process, can be estimated as being equal to about 175 [MJ/kmol $CO_2$], whereas for a two-step membrane process, it can be estimated as being equal to about 30 [MJ/kmol $CO_2$].

The invention claimed is:
1. A process of Dual Reflux Pressure Swing Adsorption for separating natural gas from gaseous compounds present at a wellhead, said gaseous compounds including at least one of helium, nitrogen, carbon dioxide, and hydrogen sulfide, the carbon dioxide and the hydrogen sulfide being referred to as acid gases, by means of at least two adsorption columns, each containing an adsorbing solid and one operating at a higher pressure than the other, wherein the column operating at higher pressure has an operating pressure close to that of the wellhead, said process comprising:

a feed of natural gas containing the acid gases is fed to an intermediate position of the column operating at a higher pressure while the other column is purged of the acid gases;

a compression ratio is within the range of 1.3 to 3, the compression ratio being defined as the ratio between the maximum and minimum pressure value at which the process operates;

a ratio between a characteristic convective time through the column and a characteristic diffusive time in the adsorbing solid is higher than 1, the characteristic convective time through a column being defined as the ratio between the empty volume of the column and the volumetric flow-rate, the characteristic diffusive time in the adsorbing solid being defined as the ratio between the square of the equivalent radius of particles of the adsorbing solid and the effective diffusivity of the gas.

2. The process according to claim 1, wherein the ratio between the characteristic convective time through the column and the characteristic diffusive time in the adsorbing solid ranges from $10^2$ to $10^4$.

3. The process according to claim 1, wherein the gaseous compounds are present in amounts ranging from 5% to 95% by volume.

4. The process according to claim 1, wherein the gaseous compounds, after separation, are pressurized and injected into a reservoir.

5. The process according to claim 1, wherein a process temperature ranges from −10° C. to 100° C.

6. The process according to claim 1, wherein the two columns are assembled in a single module, so that a tail of one column is adjacent to and in contact with a head of the other column.

7. The process according to claim 1, which is effected in one or more modules, said modules being assembled sequentially, either vertically or horizontally.

8. The process according to claim 1, wherein the adsorbing solid causes the separation of methane from the gaseous compounds due to differences between adsorbing isotherms of the gases to be separated.

9. The process according to claim 8, wherein the adsorbing solid is selected from the group consisting of zeolites, activated carbons, chemically modified carbons, alumina, silica gel and other mesoporous materials, mesoporous materials with chemical compounds including immobilized ionic liquids, Metal-Organic Frameworks, and combinations thereof.

10. The process according to claim 8, wherein the adsorbing solid belongs to the group of activated carbons with a selectivity ranging from 1.5 to 2.5 and a surface area higher than 3,000 $m^2/g$.

* * * * *